UNITED STATES PATENT OFFICE.

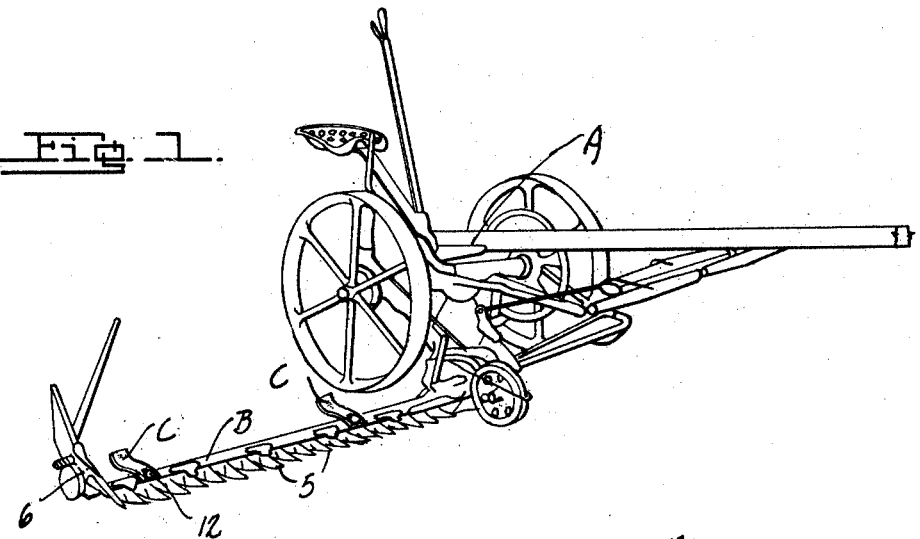
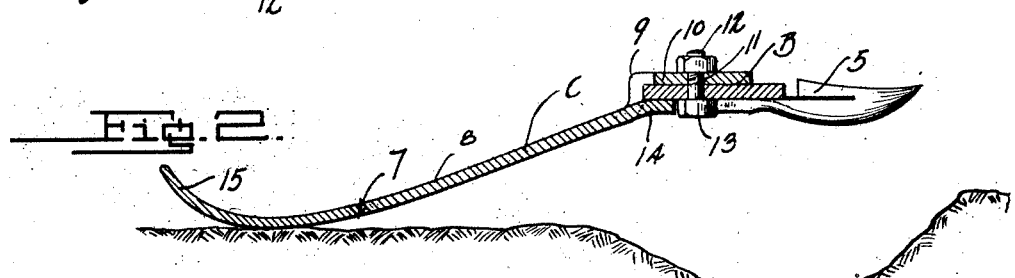
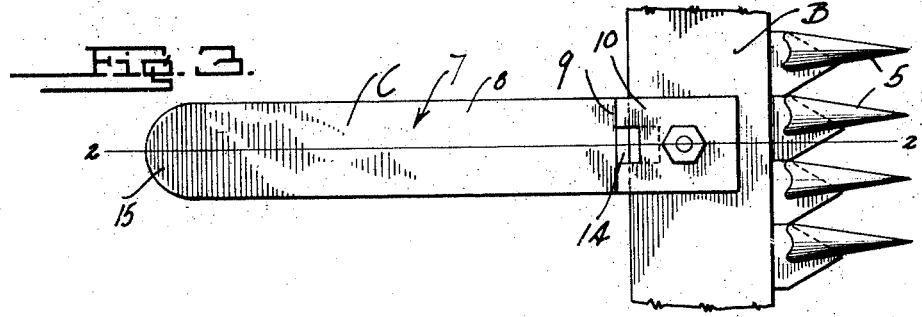
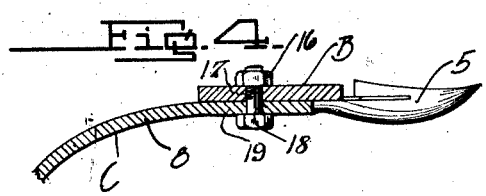

HARM FRANZEN, OF MABTON, WASHINGTON.

RUNNER FOR SICKLE-BARS.

1,367,367.

Specification of Letters Patent.   Patented Feb. 1, 1921.

Application filed December 12, 1919.  Serial No. 344,326.

*To all whom it may concern:*

Be it known that I, HARM FRANZEN, a citizen of the United States, residing at Mabton, in the county of Yakima and State of Washington, have invented certain new and useful Improvements in Runners for Sickle-Bars, of which the following is a specification.

This invention relates to attachments for mowing machines, and the primary object of the invention is to provide an improved support for the cutter bar of a mowing machine, so as to prevent the guard teeth of the bar from biting into the ground and becoming broken when the ordinary supporting shoe of the bar rides into a ditch or other irregularity in the field.

Another object of the invention is the provision of an improved runner for the cutter bar of a mowing machine which is adapted to be positioned intermediate the usual supporting shoes and is so arranged on the bar for holding the same in an elevated position, when the supporting shoe falls into a ditch or the like, thereby providing an attachment which is especially adapted for machines, used on fields having small irrigating ditches therein.

A further object of the invention is the provision of an improved runner for the cutter bar of a mowing machine embodying an arcuately curved plate adapted to be secured to the cutter bar intermediate the usual supporting shoes and arranged to engage the ground in the rear of the cutter bar and the supporting shoes.

A still further object of the invention is the provision of an improved attachment for cutter bars of mowing machines of the above character which is durable and efficient in use, one that is simple and easy to manufacture, and one which can be placed upon the market at a reasonable cost.

Other objects of the invention will appear in the following detailed description, taken in connection with the drawings, forming a part of this specification, and in which drawings:

Figure 1 is a perspective view of a mowing machine provided with the improved runner.

Fig. 2 is an enlarged detail transverse section through the cutter bar and improved runner taken on the line 2—2 of Fig. 3.

Fig. 3 is a fragmentary plan view of a cutter bar showing the improved runner applied thereto, and Fig. 4 is an enlarged fragmentary detail section through a cutter bar, showing a slightly modified type of runner applied thereto.

Referring to the drawings, in detail, wherein similar reference characters designate corresponding parts throughout the several views, the letter A indicates a mowing machine of the ordinary or any preferred type including the usual cutter bar B, which has associated therewith the improved runners C. The cutter bar B of the mowing machine A is provided with the usual outwardly extending guard fingers 5, which are secured to the cutter bar in the ordinary manner, and the cutter bar is provided at its terminal with the usual supporting shoes or runners 6.

The improved runners C are bolted or otherwise secured to the cutter bar B intermediate its ends, and adjacent to and in spaced relation to the supporting shoes 6 and each includes a relatively narrow elongated body 7 formed of any material, but preferably of resilient steel. The elongated body 7 includes the downwardly and rearwardly extending portion 8, which has its inner end bent upwardly, substantially at right angles as at 9 into engagement with the rear face of the cutter bar and then forwardly at right angles to provide the attaching foot or portion 10. The attaching foot 10 is provided with a bolt hole 11, by means of which the runner is adapted to be secured to the cutter bar. If so desired, the bolts for holding the guard fingers 5 may be utilized for holding the runners C in position and in this instance the bolts are extended through the opening 11, or if so desired a separate bolt 12 may be provided and extended through an aperture 13, formed in the cutter bar intermediate the guard fingers 5. The right angular portion 9 of the runner C is provided with an inwardly struck out tongue 14, which is adapted to engage the face of the cutter bar opposite to the face engaged by the attaching portion 10, and forms an additional support for the cutter bar so as to prevent an undue strain on the bolt 12. If so desired, the attaching foot 10 may be secured to the lower surface of the cutter bar, and in this instance the tongue 14 is struck out and bent upwardly and forwardly into engagement with the upper surface of the cutter bar.

The lower rear end of the runner C engages the ground a suitable distance in the rear of and below the cutter bar and has its rear end bent slightly upwardly as at 15.

In Fig. 4 is illustrated a slightly modified form of the invention in which form the runner C is attached to the lower surface of the cutter bar intermediate the finger guards 5, and the same is held in place by a suitable bolt 16, extended through registering openings 17 and 18 formed respectively in the cutter bar B and the attaching portion 19 of the runner. In this instance, the tongue 14 is eliminated, and swinging movement of the runner C on the bolts 16 is prevented, owing to the position of the inner end of the runner between the shanks of the guards 5, which prevents any lateral movement thereof. In this instance, the runner may also be bolted to the upper surface of the cutter bar if so desired.

The improved runners C are particularly adapted for mowing machines, which are used on fields which are irrigated by small ditches, where the teeth or guard fingers are very apt to be broken when the supporting shoes or runners 6 ride into the ditches.

In use of the improved runner, the same being positioned intermediate the shoes and in the rear thereof, effectively supports the cutter bar when the ordinary shoe rides into a ditch, thereby preventing the guard fingers from digging into the ground and becoming broken. The runners are also particularly adapted for use on fields, in which the ground is broken or irregular, and as clearly shown in Fig. 2 when the ordinary shoe or cutter bar rides into a depressed portion of the ground, the improved runner C will support the cutter bar until the shoe rides out of the same.

From the foregoing description it can be seen that an improved attachment is provided for cutter bars of mowing machines which is exceptionally durable and efficient in use, which will support the cutter bars and prevent the guard fingers from digging into the ground and becoming broken.

Changes in details may be made without departing from the spirit or scope of my invention; but,

I claim:

1. In a mowing machine, the combination with a cutter bar including the usual supporting shoes, of an attachment therefor secured to the cutter bar intermediate its ends and adapted to engage the ground in rear of and below the cutter bar.

2. In a mowing machine, the combination with a cutter bar having its terminals provided with supporting shoes, of a runner attachment therefor including a pair of spaced plates curved transversely and secured to the cutter bar intermediate the supporting shoes, and arranged to engage the ground in the rear of the cutter bar and supporting shoes.

3. In a mowing machine, the combination with a cutter bar including a pair of supporting shoes, of a runner attachment therefor secured to the cutter bar intermediate its ends and extending downwardly and rearwardly therefrom.

4. In a mowing machine, the combination with a cutter bar having a pair of supporting shoes, of a runner therefor including an elongated body having a forwardly extending attaching portion arranged to be secured to the cutter bar, the body being curved downwardly and rearwardly and arranged to engage the ground in rear of the supporting shoes.

5. In a mowing machine, the combination with a cutter bar having a pair of supporting shoes, of a runner therefor including an elongated body having a forwardly extending attaching foot adapted to be secured to the cutter bar, a struck up tongue carried by the body and arranged to engage the opposite face of the cutter bar opposite to the attaching portion, the body of the runner extending downwardly and in the rear of the cutter bar.

6. A runner for the cutter bar of mowing machines including an elongated curved body having a forwardly extending attaching foot.

7. A runner including a flat elongated narrow body including a downwardly and rearwardly curved portion and a forwardly extending attaching foot, and a struck up tongue carried by the body and arranged below the attaching foot.

HARM FRANZEN.